March 29, 1960 J. T. McKEON, JR., ET AL 2,930,908
SUPERCONDUCTOR SWITCH
Filed Dec. 26, 1957
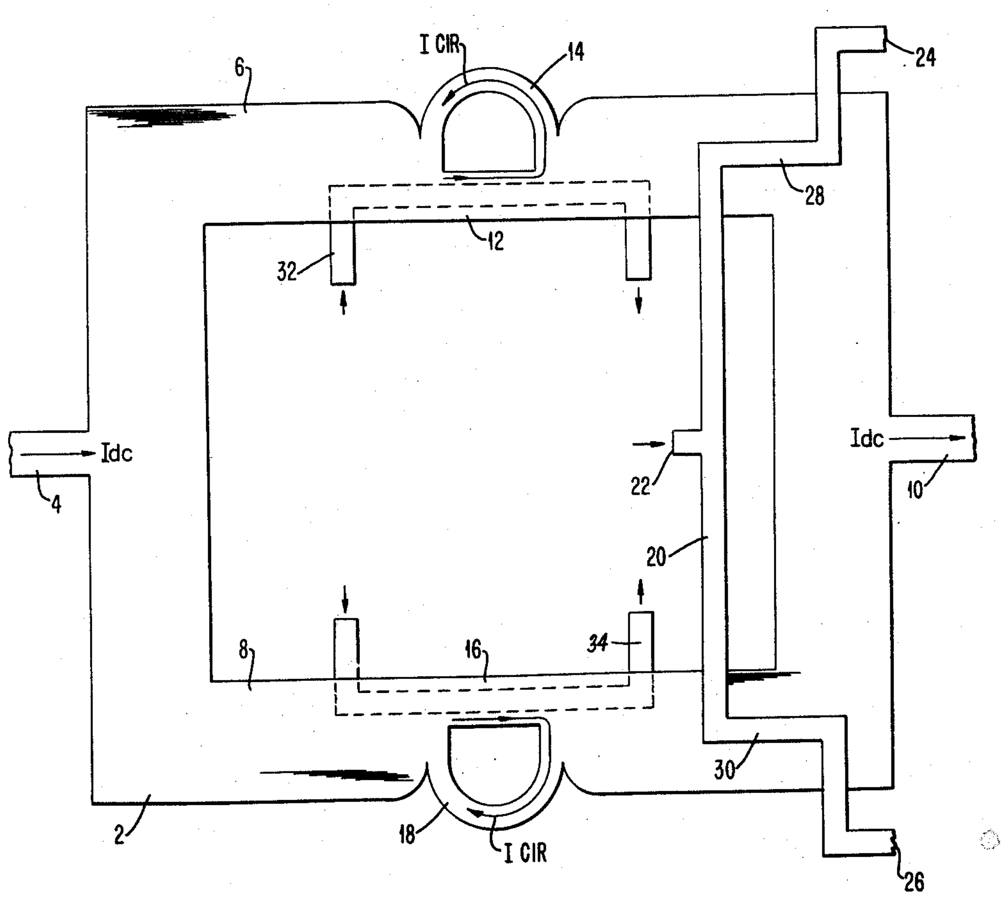
INVENTORS
JOHN T. McKEON JR.
GERALD B. ROSENBERGER
BY George Baron
ATTORNEY

United States Patent Office 2,930,908

Patented Mar. 29, 1960

2,930,908

SUPERCONDUCTOR SWITCH

John T. McKeon, Jr., Clinton Corners, and Gerald B. Rosenberger, North Wappingers Falls, N.Y., assignors to International Business Machines Corporation, New York, N.Y., a corporation of New York Application December 26, 1957, Serial No. 705,261

7 Claims. (Cl. 307—88.5)

This invention relates to switching devices, and more particularly to those switching devices employing superconductors.

The properties and characteristics of superconductors have been treated in such texts as "Super-fluids," volume I by Fritz London, published in 1950 in New York by John Wiley and Sons, Inc., and "Super-conductivity" by D. Shoenberg, published in 1952 in London by the Cambridge University Press. In general, a superconductor is a metal, an alloy or a compound that is maintained at very low temperatures, i.e., from 17° Kelvin to the practical attainability of absolute zero, in order that it may present no resistance to current flow therein. It was discovered that in the case of mercury its electrical resistance decreased as a function of decreasing temperature until at a given temperature (about 4.12° K.) the resistance very sharply vanished, or its measurement was too small to be detected. The temperature at which the transition to zero resistance took place in mercury was referred to as its critical temperature; its state, upon reaching zero resistance, was that of a superconductor.

The critical temperature varies with different materials and for each material it is lowered as the intensity of the magnetic field around the material is increased from zero. Once a body of material is rendered superconductive, it may be restored to the resistive or normal state by the application of a magnetic field of a given intensity to such material; the magnetic field necessary to destroy superconductivity is called the critical field. Thus it is seen that one may destroy superconductivity in a specific material by applying energy to it in the form of heat so as to make such material reach its critical temperature, or in the form of a magnetic field so as to make it reach its critical field.

Since a superconductive path can be made resistive upon application of a critical field or critical temperature, to a superconductor lying in such path, one can use low temperature devices as switches. The critical temperature or critical field may be employed to make current flowing in a first superconducting path switch to a second superconductive path because such critical temperature or critical field makes the first path go resistive. It is desirable to then apply a second critical field or critical temperature to the second path so that the latter may go normal resistive, permitting a current flowing in the second path to switch to the first path. By employing these critical fields or temperatures with a plurality of superconductive paths, one may obtain a switch or a bistable device, such as a flip-flop.

A fundamental property of superconductivity is that a magnetic field cannot penetrate a superconductor until the applied magnetic field reaches a critical value at which point superconductivity is destroyed.

A concept which is pertinent to this invention is that a magnetic field applied to either a superconducting plane or an area enclosed by a superconducting loop cannot cause any net change in flux through the plane or the loop. In the case of the superconducting loop, the net flux through the loop would be maintained at zero by equal and opposite flux lines which are supported by a circulating current around the loop. When the circulating current exceeds the critical current value of the superconductor comprising the loop, superconductivity is destroyed and the circulating currents are dissipated through $I^2R$ losses. By controlling the dimensions of the superconducting loop, the critical current of the loop can be controlled. The concentration of field due to the induced current can be much greater than the concentration of the drive current with proper design of the superconducting loop.

Consequently the present invention deals with a means for disposing a drive wire over a superconductive film so as to induce a circulating current in a superconducting loop. The superconducting film is modified so as to create a shortened auxiliary path for such circulating current, and also to create a circulating current that is additive to any current already flowing in the superconductive film. The circulating current, when added to the superconductive current, causes the supreconductive film to be driven normal resistive, and the shortened path increases the magnetic coupling between the drive wire and that portion of the superconductive surface being influenced by said drive wire, so that less drive current is needed to drive said superconductor normal. The geometry of the superconductive film will be described hereinafter when the detailed description of the invention is given.

Accordingly it is an object to obtain a relatively fast switching device utilizing superconductive elements.

It is a further object to employ a shortened auxiliary path for circulating currents induced in a superconductive surface by a drive wire so as to obtain more efficient switching of said superconductive surface from its superconductive state to its normal state.

It is a further object to employ the heat generated in the superconductive surface when the latter switches from one state to another as a delay mechanism for enhancing the switching of current flow from one path to another.

Other objects of the invention will be pointed out in the following description and claims and illustrated in the accompanying drawings which disclose, by way of example, the principles of the invention and the best modes which have been contemplated of applying those principles.

The sole figure of the drawing is a showing of a low temperature switch wherein there is shown a superconductive film 2 of lead, tantalum, or any suitable element, compound or alloy, that is deposited on a suitable substrate, such film 2 having a D.C. input terminal 4, two paralleled current paths or branches 6 and 8, and a D.C. return terminal 10. Each branch 6 and 8 is modified along its length so as to provide a main current path 12 and an auxiliary path 14. The auxiliary path 14 is in the form of a loop and its width is approximately half that of the width of the main path 12. Branch 8 is similarly modified so that two paths are created, namely, main path 16 and auxiliary path 18. Winding 20 is a sense winding for detecting which branch, 6 or 8, is carrying current. Sense winding 20 has an input terminal 22 and two output terminals 24 and 26, wherein section 28 of the sense winding 20 is a soft superconductor and lies above or below branch 6, and section 30 of sense winding 20 is another soft superconductor that lies above or below branch 8. Located in the vicinity of main path 12 is a drive wire 32 for creating a magnetic field that couples main path 12 with such drive wire 32. In a similar manner and for a similar purpose, drive wire 34 is disposed next to main path 16. Although the drive wires 32 and 34 are shown as placed below the superconductive surfaces 12 and 16 they will influence, such drive wires may be placed above or to the side of such superconductive surfaces.

For the purposes of aiding in the discussion to follow, a hard superconductor is defined as a superconductor which, at a given operating temperature, requires a relatively high field or current to cause it to go resistive or normal conducting, whereas a soft superconductor is defined as that superconductor which requires a relatively low field or low current to cause it to go normal.

The operation of the superconductive switch will now be described. Assuming that one of the branches, for example branch 8, has been made normal resistive by the application of a critical field or temperature to its surface. A steady current $I_{dc}$ will pass entirely through branch 6 to the D.C. return terminal 10, the entire current going through branch 6 instead of dividing between branch 6 and branch 8 because the ratio of a finite resistance to zero resistance is infinite. The current $I_{dc}$, entering at input terminal 4, sees branch 8 as an infinite impedance compared to that of branch 6 so it passes entirely through branch 6. When branch 8 returns to its superconductive state, the energy considerations of the circuit are such that there are no forces available to make $I_{dc}$ divide between branches 6 and 8. The current $I_{dc}$ continues to flow only through superconductive branch 6 and not through superconductive branch 8. It is understood that the current $I_{dc}$ is always slightly less than the critical current $I_{cr}$ of the superconductive elements in branch 6, otherwise branch 6 will be driven normal resistant by the very current it is to carry in its normal operation as a switch.

$I_{dc}$ will split up in passing through path 12 and loop 14 inversely proportional to the relative inductances of the two paths. Since path 12 is wider and shorter than that of loop 14, the latter has a higher inductance than the former, and more current will flow through path 12 than through loop 14. The portion of $I_{dc}$ that flows through path 12 is referred to as $I_{dc_{12}}$ and that through loop 14 as $I_{dc_{14}}$, wherein $I_{dc_{12}} > I_{dc_{14}}$.

When it is desired to switch the current $I_{dc}$ from branch 6 to branch 8, a current pulse from a suitable generating source is applied to drive winding 32, such a pulse being of the proper polarity and of sufficient magnitude such that it creates lines of flux about drive wire 32 in the area of the main path 12 of the modified portion of branch 6. Such lines of flux cannot cause a net change in flux through the area enclosed by superconducting paths 12 and 14, so they set up an opposing flux which is sustained by a circulating current $I_{cir}$ that will flow about main path 12 and loop 14, such circulating current $I_{cir}$ being in the same direction as $I_{dc_{12}}$. Thus the total current through main path 12 is equal to $I_{dc_{12}}$ and $I_{cir}$. Such total current exceeds the critical current for main path 12, making the latter go normal resistive, and heating up such path 12 during the process of going resistive. When path 12 becomes resistive, $I_{dc}$ current will then try to push through loop 14. The passage of path 12 from its superconductive state to its normal state will cause the $I_{cir}$ current to collapse since there is not "held-back" flux to support it. Full current $I_{dc}$, now flowing through the narrow loop 14, causes loop 14 to go normal and heat up. Since path 12 and loop 14 are both normal resistive for that finite time that the generated heat, due to switching from the superconductive state to the normal state, persists, the current $I_{dc}$ will switch to the superconducting path 8. When branch 6 returns to its superconductive state, it does not carry any current, the main current $I_{dc}$ flowing entirely through branch 8, splitting up in main path 16 and loop 18, then out through output terminal 10.

One may now determine which branch 6 or 8 is carrying the main current $I_{dc}$. If branch 6 is the branch that is carrying the full current $I_{dc}$, then soft superconductor 28, lying in the path of current $I_{dc}$, will go resistive. Thus, when a sampling current pulse is applied at input terminal 22 of sense winding 20, such sampling current will flow through leg 30 to actuate a suitable indicator.

If branch 8 is carrying all of the main current $I_{dc}$, then soft superconductor section 30 would be driven to its resistive state and a sampling current pulse applied at input terminal 22 of sense line 20 would flow through leg 28.

It is seen that the device described herein can be operated as a switch or as a flip-flop. In the latter case, the "1" state would exist when $I_{dc}$ is flowing in branch 6 and a "0" would exist when current is flowing in branch 8. A current flowing through leg 30 represents a "1" and a current flowing through leg 28 represents a "0."

An exemplary though nowise limiting set of valves for the flip-flop shown herein would call for the superconductive branches 6 and 8 to be fifty mils wide and 1000 Angstroms thick, the main paths 12 and 16 about 20 mils wide, the loops 14 and 18 about 10 mils wide, and the steady current $I_{dc}$, sampling current and drive current about one or two amperes. Obvious changes in dimensions and current values can be made without departing from the spirit of the invention.

The hereinabove described invention obtains a fast switching circuit by employing a superconductive loop in the current path of a superconductor. The presence of such loop diminishes the amount of drive current necessary to make a superconductive branch go normal. The loop also increases the magnetic coupling between a drive wire and the superconductive path to be affected by said drive wire by furnishing a short path for induced circulating currents. Without such loop 14 or 18, the induced currents would have to travel through both branches 6 and 8, such lengthy path almost nullifying the desired additive effect of the induced current to the current $I_{dc_{12}}$. The use of superconductive wires as drive wires permits many consecutive stages of the present switch to be used and also lessens heat dissipation problems because no heating occurs in the drive lines when driving either branch 6 or 8 resistive. The heat generated by the superconductive portions 12 and 14 or 16 and 18, when they go normal, creates enough delay to permit switching of $I_{dc}$ from one branch to another. The heat transfer characteristics of paths 12 and 14 and the underlying substrate, as well as the bath of liquid helium surrounding the switch, will determine how quickly the temperature returns to a point below the critical temperature of the superconductive section referred to as path 12 and loop 14.

We claim:

1. A switching element comprising in combination a first superconductive main path and a second superconductive main path in electrical parallel with said first path, means for modifying the superconductive current flow in each main path comprising a parallel electrical circuit therein, said parallel circuit comprising a first auxiliary superconductive path that is continuous with said main path but is reduced in width, and a superconductive loop path whose width is less than that of said auxiliary path.

2. A switching element comprising in combination a first superconductive main path and a second superconductive main path in electrical parallel with said first path, means for modifying the superconductive flow in each path comprising a parallel electric circuit therein, said parallel circuit comprising a first auxiliary superconductive path that lies in a segment of said main path but is reduced in width and a second auxiliary path, said second auxiliary path having a higher inductance than said first auxiliary path.

3. A switching element as described in claim 1 wherein said second auxiliary path is longer than said first auxiliary path.

4. A switching element comprising in combination a first superconductive main path and a second superconductive main path in electrical parallel with said first path, means for modifying the superconductive current flow in each main path comprising a parallel electric circuit therein, said parallel circuit comprising a first auxiliary superconductive path that lies in a segment of said main path but is reduced in width and a second auxiliary path, said second auxiliary path having a higher inductance than said first auxiliary path, and means for applying a magnetic field to each of said segmented superconductive sections.

5. A flip-flop circuit comprising in combination a first superconductive main path and a second superconductive main path in electrical parallel with said first path, wherein superconductive current flows in one main path and not in the other, means for modifying the superconductive current flow in each main path during current flow therein comprising a parallel electric circuit therein, said parallel circuit comprising a first auxiliary superconductive path that lies in a segment of each main path but is reduced in width and a second auxiliary path, said second auxiliary path having a higher inductance than said first auxiliary path, and means for applying a magnetic field to that superconductive segment that is conducting current so as to induce a circulating current in said segment and its associated auxiliary path, such circulating current being in the same direction as the current in said segment.

6. A flip-flop circuit comprising in combination a first superconductive main path and a second superconductive main path in electrical parallel with said first path wherein superconductive current is made to flow in one main path and not in the other, means for modifying the superconductive current flow in each main path during current flow therein comprising a parallel electric circuit therein, said parallel circuit comprising a first auxiliary superconductive path that lies in a segment of each main path but is reduced in width and a second auxiliary path, said second auxiliary path having a higher inductance than said first auxiliary path, and means for applying a magnetic field to that superconductive segment that is conducting current so as to induce a circulating current in said segment and its associated path, such circulating current being in the same direction as the main current through said segment so that the sum of said two currents exceeds the critical current of said segment so as to drive said segment to its normal resistive state, permitting the main current to switch to the main superconductive path which was originally not carrying superconductive current therein.

7. A flip-flop as defined in claim 6 wherein means are provided for sensing which of the two main superconducting paths is conducting current.

References Cited in the file of this patent

Garwin: Analysis of the Operation of a Persistent-Super-Current Memory Cell. October 1957, IBM Journal, pages 304 to 308.